INVENTOR
Mortimer Moss
BY Polachek & Saulsbury
ATTORNEYS

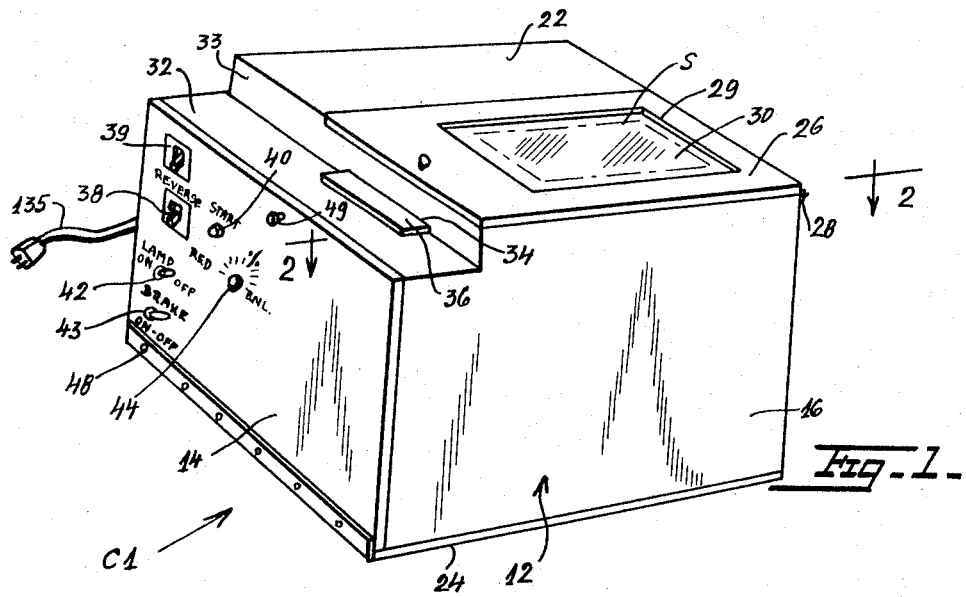
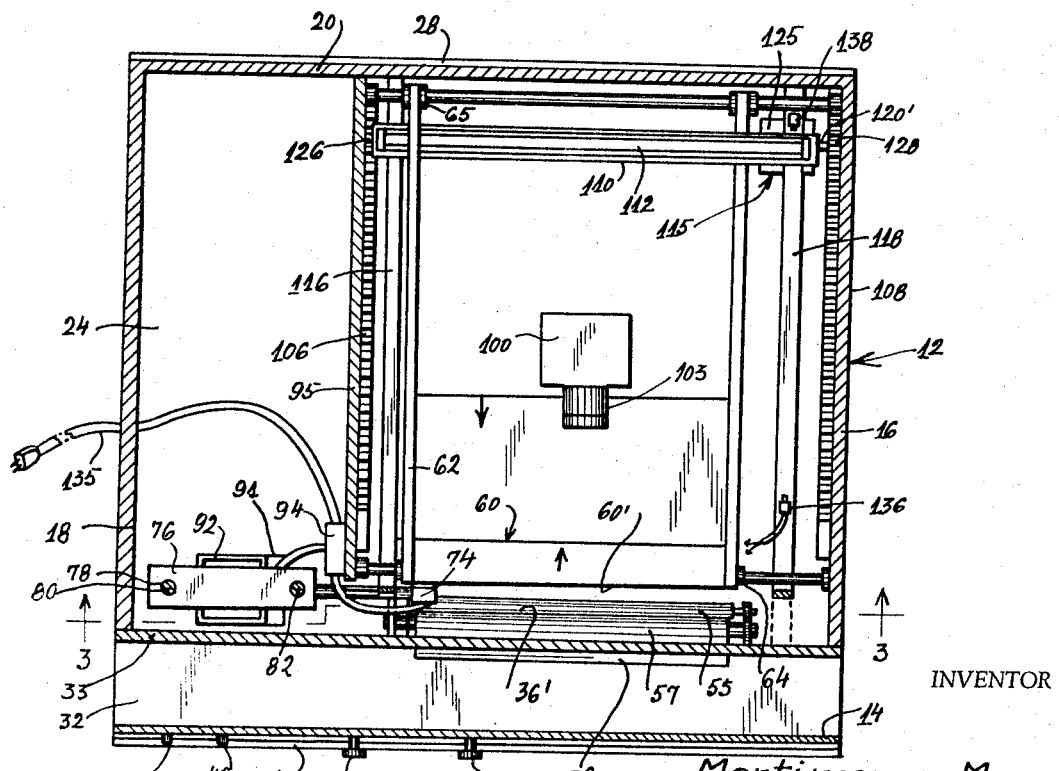

INVENTOR
Mortimer Moss
BY Polachek & Saulsbury
ATTORNEYS

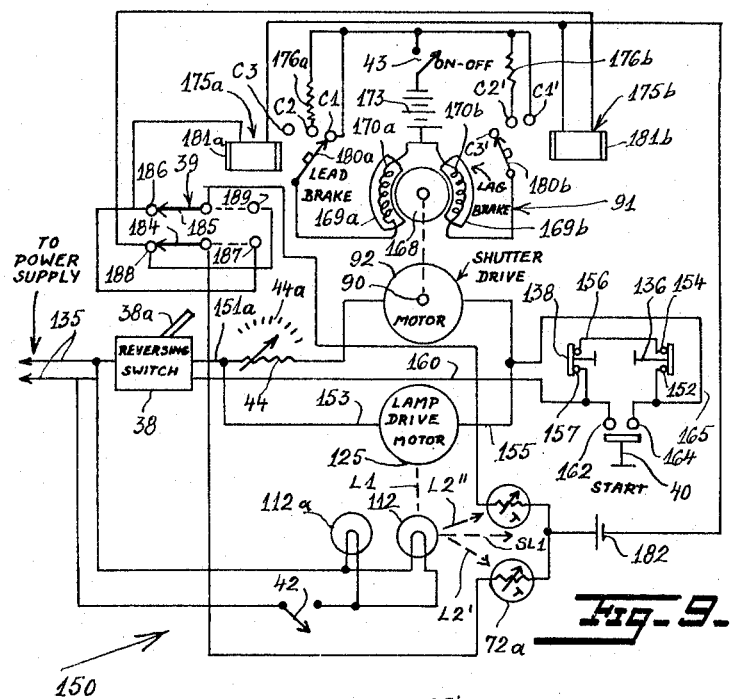

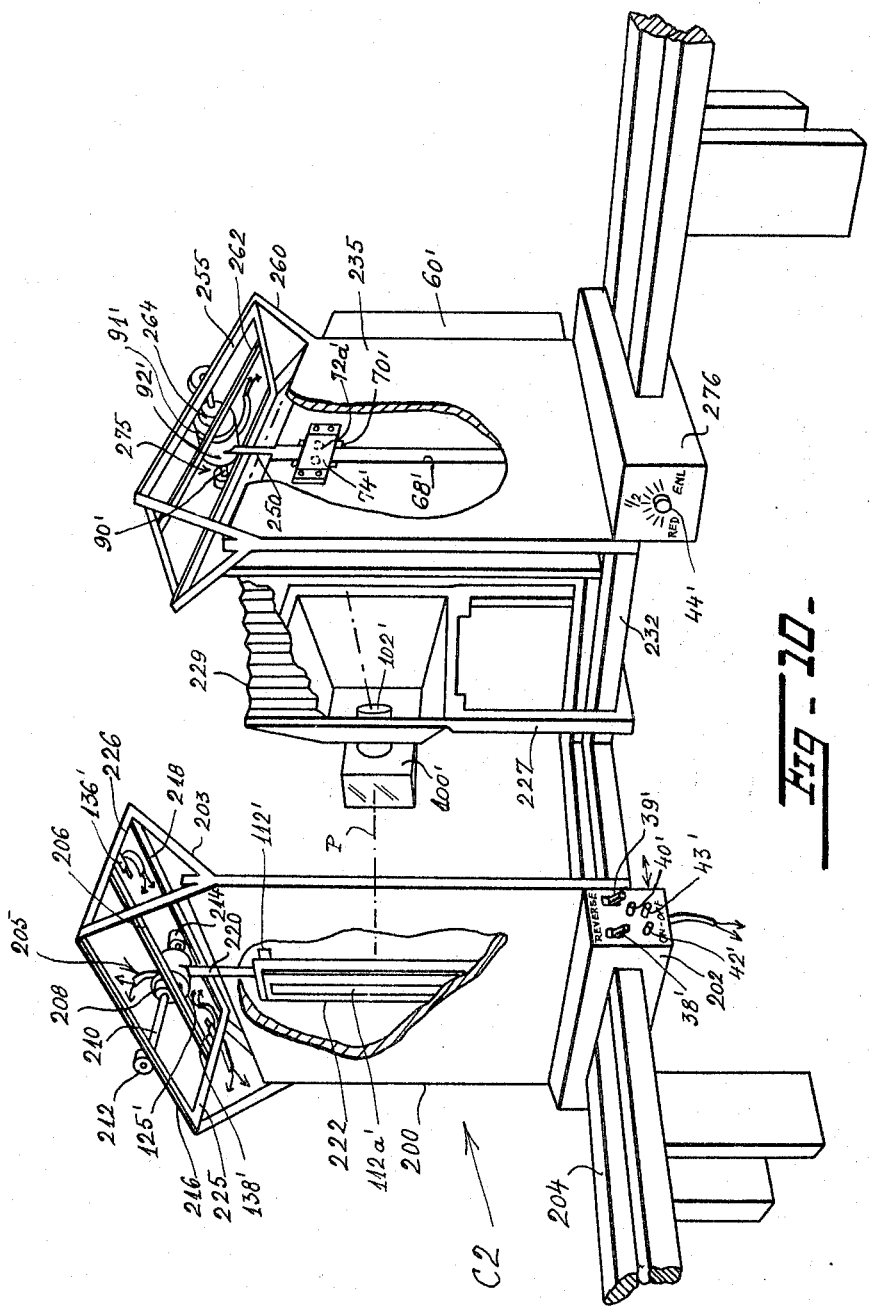

United States Patent Office 3,380,339
Patented Apr. 30, 1968

3,380,339
PHOTOELECTRIC FOLLOWUP SYSTEM
Mortimer Moss, 133—01 Booth Memorial Ave., Flushing, N.Y. 11355
Filed Aug. 27, 1965, Ser. No. 483,234
14 Claims. (Cl. 88—24)

This invention concerns photocopy cameras with movable slit shutters and movable copy scanning lamps driven by independent motors, the shutter drive motors being controlled by photoelectric control means.

The invention may be embodied in a small photocopying device or in a large copying camera. In both forms of the invention, illuminating means including one or more scanning lamps is carried past a copy board or plate on which the subject to be copied is mounted. A long narrow moving area of the subject is illuminated. An image of this area is focused through a lens on to a stationary photosensitive film or sheet. In front of the photosensitive sheet or film is a movable shutter sheet or plate having a long narrow slit. This shutter is driven past the photosensitive sheet to expose successive long narrow areas of the sheet through the slit. A supplementary prism may be provided in association with the lens. The shutter and scanning lamp are driven by independent motors. The shutter carries photoelectric cells and associated circuitry for picking up a light beam from the illuminated subject on the copy board or from a separate light source. The photoelectric cells are connected in a control circuit with braking means at the drive motor of the shutter for controlling this drive motor to operate coordination with movement of the scanning lamp. The speed of the shutter drive motor is adjustable so that copy can be enlarged or reduced in the camera.

It is therefore one object of the invention to provide a copying camera including a motor driven copy scanning lamp and motor driven slit shutter.

Another object is to provide a copying camera as described, wherein the slit shutter carries photoelectric cells responsive to light reflected from illuminated copy or from a separate lamp carried by the copy scanning means, the photoelectric cells being connected in a control circuit operative to keep the shutter drive coordinated with the lamp drive.

Another object is to provide a copying camera as described, wherein the motor driving the shutter is provided with braking means actuated by the control circuit.

Other objects are to provide a copying camera in which total effective exposure is adjustable by the rate of movement of a copy scanning lamp, by the use of filter over a slit of a movable shutter, by varying the width of the shutter slit, and by changing the position of photoelectric cell with respect to the shutter slit.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of a photocopying camera embodying the invention.

FIG. 2 is an enlarged horizontal sectional view taken on line 2—2 of FIG. 1.

FIG. 7 is an enlarged sectional view of a motor braking device.

FIG. 8 is an enlarged view similar to a part of FIG. 3, illustrating a mode of operation of the invention.

FIG. 9 is a simplified diagram of the electric circuit employed in the camera.

FIG. 10 is a diagrammatic perspective representation of another copying camera embodying the invention.

FIGS. 11, 12 and 13 are diagrammatic plan views of parts of the camera of FIG. 10.

Figure 3:
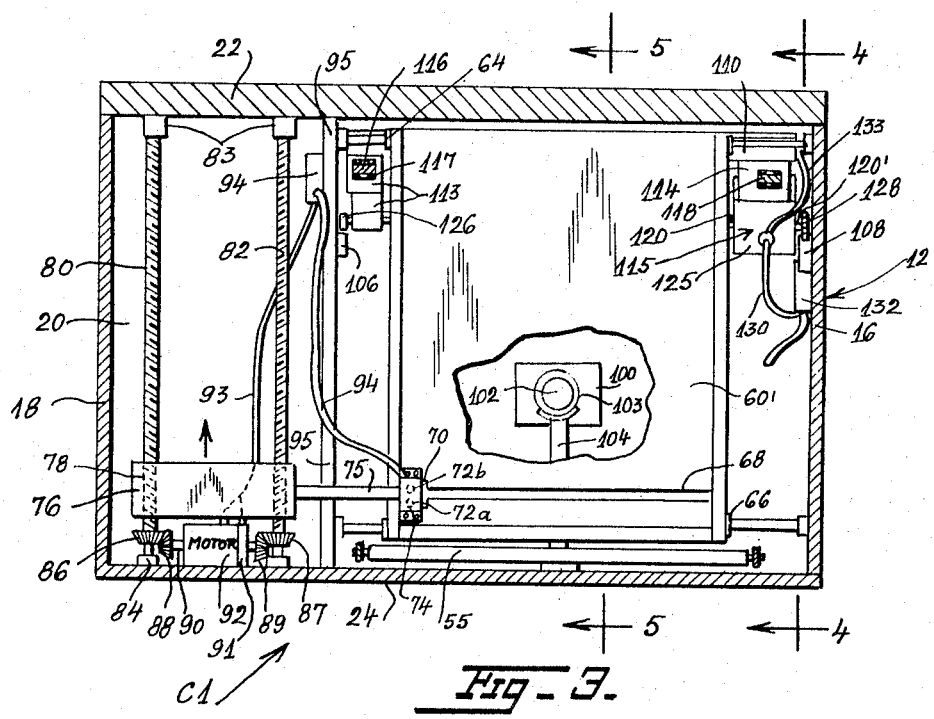
FIG. 3 is a vertical cross sectional view taken on line 3—3 of FIG. 2.
Figure 4:
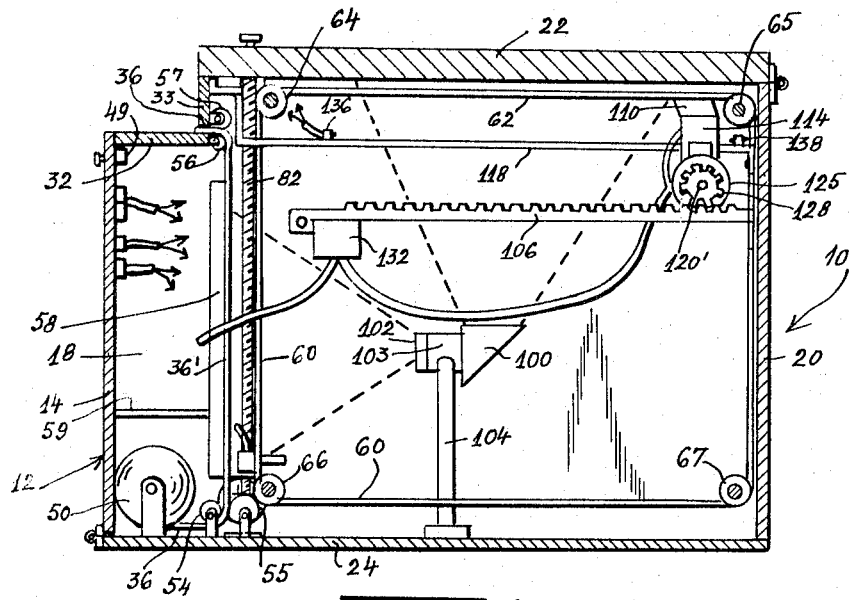
FIG. 4 and FIG. 5 are vertical cross sectional views taken on line 4—4 and line 5—5 respectively of FIG. 3.
Figure 5:
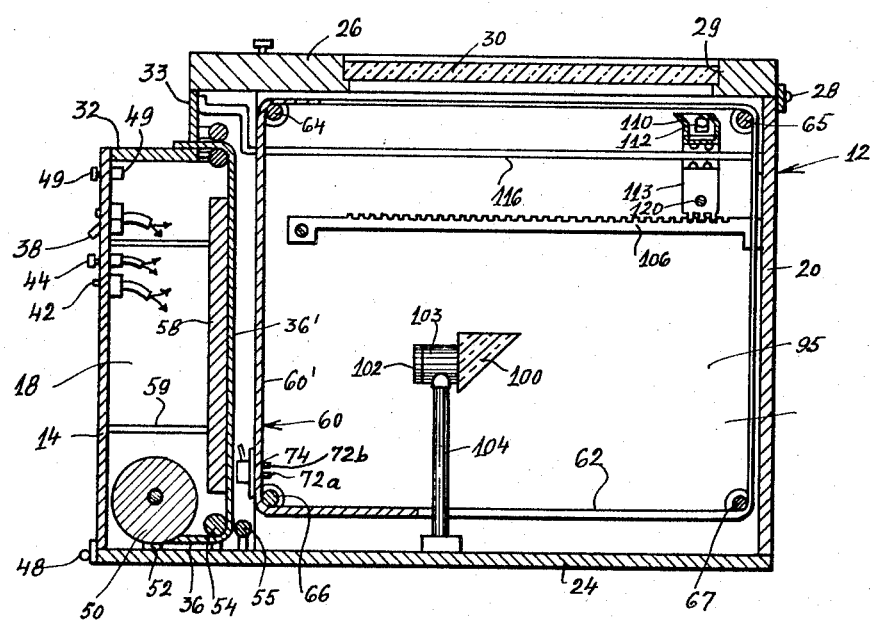

Referring first to FIGS. 1–5, there is shown a copying camera C1. This camera is housed in a cabinet 12 having a front vertical wall 14, vertical side walls 16, 18, vertical rear wall 20, horizontal top wall 22 and horizontal bottom wall 24. The top of the cabinet is provided with a rotatable frame 26 attached by hinge 28 to the back wall. In this frame is a rectangular opening 29 in which is set a transparent glass plate or window 30. Subject matter to be copied by the camera is mounted on the plate 30 in the recess defined by the edges of opening 29. The cabinet has a horizontal ledge 32 and a narrow vertical front wall section 33 with a slot 34 from which issues the leading edge of a film strip or sheet 36. On the front wall of the cabinet is a switch 38 which controls motor reversal, a switch 39 which controls reversal of photoelectric cell operation, a START switch 40, ON-OFF lamp switch 42, ON-OFF brake switch 43, and enlargement setting control 44. The front wall 14 is attached by a hinge 48 to the bottom of the cabinet. This wall can be opened forwardly to provide access to the interior of the cabinet. The wall is held closed by latch 49 engaging ledge 32.

Inside the cabinet is a supply roll 50 of photosensitive paper or film 36 rotatably supported in brackets 52. The film is entrained between idler rollers 54, 55 at the bottom of the cabinet; see FIG. 4. The film extends vertically upward then forwardly between idler rollers 56, 57 and then outwardly of slot 36. The film has a flat, straight vertical section 36′ disposed at the rear side of vertical platen 58 which is supported by brackets 59 at the rear of front wall 14.

Figure 6:
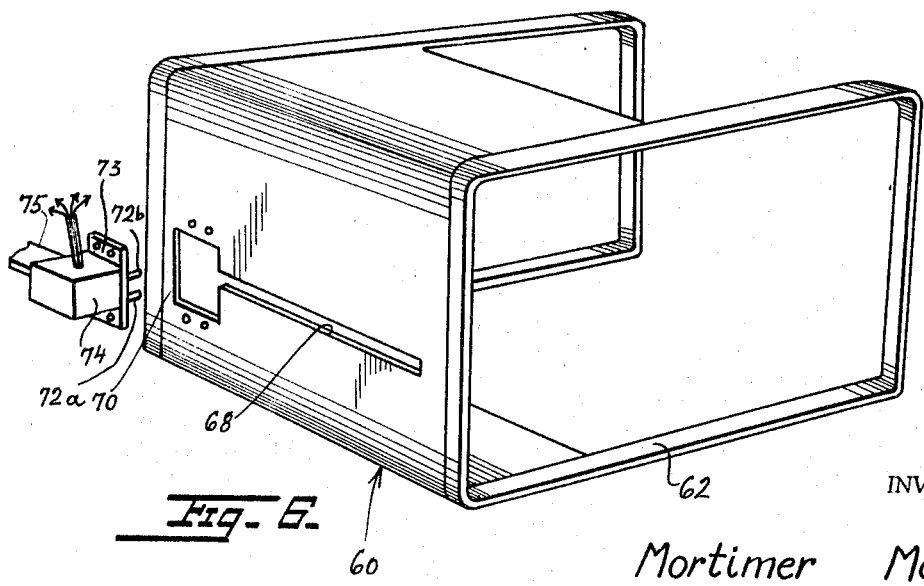
FIG. 6 is a perspective view of the shutter employed in the camera of FIGS. 1–5, shown with a photoelectric control device.

In front of the film section 36′ is a flexible cloth or plastic shutter 60 shown to best advantage in FIG. 6. This shutter has a flexible rectangular opaque sheet-like body joined at opposite edges to flexible, endless belts 62 and extending partially along the belts. The belts are entrained at upper front and rear rollers 64, 65 and lower front and rear rollers 66, 67. A horizontal slot 68 is formed in the shutter body. The slot terminates in a rectangular enlargement. Adjacent the slot is a hole 70 through which extend photoelectric cells 72a, 72b. The cells are supported by a housing 74 attached to the shutter by rivets or other suitable fasteners engaging flanges 73. A shaft 75 extends laterally from the housing. This shaft is secured to a block 76 having two spaced, vertical threaded holes 78; see FIGS. 2, 3. The holes are threaded in opposite directions.

The block 76 is supported by two oppositely threaded vertical screw shafts 80, 82 journaled at top and bottom ends in bearings 83, 84. The screw shafts carry bevel gears 86, 87 near their lower ends. These gears are engaged with bevel gears 88, 89 at opposite ends of drive shaft 90 of motor 92. Onshaft 90 is an electromagnetic brake 91. Brake 91, motor 92 and photoelectric cells 72a, 72b are connected in a control circuit in circuit box 94 via wires 93, 94. The circuit box is supported on vertical partition 95.

By the arrangement described, the shutter has a vertical section 60′ closely spaced with respect to the vertical film section 36′. The shutter section moves vertically and the horizontal slot 68 progressively exposes the film to the interior of the camera cabinet. The motor is a reversible one and is connected in a circuit so that the shutter will be driven and the slot 68 will move vertically upward or downward for a predetermined length of the film section 36'. The driving force of the motor is transmitted via the bevel gears and screw shafts to the block 76 to elevate or lower the block. The block in turn lifts or lowers the shaft 75 and housing 74 attached to the freely movable shutter.

Underneath the glass plate 30 is a 45° prism 100 optically aligned with a lens 102 and attached to the lens mounting 103. This lens can be adjusted for changing the magnification ratio, i.e., the relative enlargement or reduction of the image cast on film section 36'. The prism and lens are supported on a post 104 on the bottom 24 of the cabinet. This post can be made adjustable in length and position in the cabinet.

Located inside the cabinet just below the plate 30 and above the horizontal plane of the lens and prism are two rack gears 106 and 108; see FIG. 2. These rack gears are secured to partition 95 and side wall 16 respectively. On these rack gears rides a carriage 115 including a lamp fixture 110 having a tubular lamp 112 extending horizontally with sides of the fixture arranged to illuminate a long narrow area extending transversely of the plate 30. This illuminated area is exposed to the prism 100 and is focused in lens 102 so that the image of any subject on a sheet S or other subject matter placed on plate 30 will be cast upon the film section 36' with shutter section 60' standing in the optical path.

The lamp fixture is supported on rectangular carriage members 113, 114 at opposite ends. The members have horizontal openings 117 through which extend horizontal rails 116, 118. The rails are fixed in position between the rear wall 20 and front wall section 33. Ball bearings are provided in the carriage members so that the carriage members slide freely along the rails. The carriage member 113 carries a cross shaft 120. This shaft is connected to motor 125 carried by carriage member 114. Spur gear 126 at one end of the shaft rides on and engages with rack gear 106. Spur gear 128 attached to stub shaft 120' of motor 125 engages on rack gear 108. When the motor is operated it rotates both shafts. This drives the entire carriage assembly horizontally so that the lamp 112 progressively illuminates the effective copying area of the plate 30 by a moving narrow area of light. The motor 125 is connected via a flexible cable 130 to a circuit box 132 supported by rack gear 108. Another cable 133 connects cable 130 to the lamp fixture for energizing the lamp. Electric power is brought to the several electrical components of the camera via an electric power cable 135 connected to circuit box 94; see FIG. 2. Two limit switches 136 and 138 are mounted on rail 116 and are actuated by contact with the carriage assembly at opposite ends of travel of the carriage assembly on the rails and rack gears.

The electric circuit 150 of the camera is best shown in FIG. 9 to which reference is now made. The power supply cable 135 is connected to motor reversing switch 38. The reversing switch has an operating handle 38a. Connected to one terminal 151a of the reversing switch 38 is terminal 153 of lamp drive motor 125. The other terminal 155 of this motor is connected to contact 152 of limit switch 136. The limit switch 136 is a normally closed pushbutton type of microswitch. Contact 154 of switch 136 is connected to contact 156 of the other limit switch 138. The other contact 157 of normally closed limit switch 138 is connected via wire 160 to the other output terminal 151b of the reversing switch 38. The START switch 40 is a normally open pushbutton switch. One contact 162 of this switch is connected to wire 160. The other contact 164 is connected to wire 165 which terminates at motor terminal 155.

Dotted line L1 indicates that the motor 125 operatively moves the lamp 112 to cast a narrow scanning line of light upon the copy sheet S indicated by dotted lines in FIG. 1. The scanning line is reflected and then focused via the prism and lens on the shutter slot 68. It will be noted that in FIG. 8 dotted line SL1 represents the center of the reflected line of light reaching the film section 36' via slot 68 in shutter 60.

The shutter drive motor 92 has one terminal connected to speed adjusting control 44 which in turn is connected to terminal 151a of reversing switch 38. Control 44 is a variable resistor or other suitable speed control device which has a dial or scale 44a calibrated in terms of relative magnification and reduction of the image case on film section 36' with respect to the size of the graphic copy on sheet S. The other terminal of motor 92 is connected in parallel with terminal 155 of motor 125 to contact 152 of switch 136 and to contact 164 of switch 40.

Lamp 112 is connected in series with the ON-OFF switch 42 to power line 135. Photoelectric cells 72a and 72b are known commercially available types of photoconductors. Each cell changes internal resistance depending on the amount of light impinging on it. As the light intensity increases the resistance decreases or conversely the conductivity increases. The cells are connected in circuit with the motor braking device 91 shown to best advantage in FIG. 7.

On the shaft 90 of motor 92 is affixed a soft iron disk 168 having high magnetic susceptibility and low magnetic retentivity. Disposed adjacent to the periphery of disk 168 are two arcuate electromagnetic cores 169a, 169b. Each core is wound with a coil 170a or 170b. When either coil is energized then the associated core is magnetized. The magnetized core then induces a magnetic field in an adjacent portion of disk 168 and magnetically attracts the disk to retard rotation of the disk 168 and shaft 90. The cores 170a, 170b are supported by screws 171 non-rotationally in the stationary housing 172 of the braking device 91.

One end of each of the coils 170a, 170b is connected to one terminal of a battery or power supply 173. The other terminal of the power supply 173 is connected via ON-OFF switch 43 directly to contacts C1, C1' of the two relays 175a, 175b, and is also connected via resistors 176a, 176b to contacts C2, C2' respectively of the relays. Contacts C3, C3' of the relays are open circuited. Poles 180a, 180b of the relays are normally disposed at the contacts C1, C3' when the coils 181a, 181b of the relays are deenergized. Coil 170a is connected at its other end to pole 180a and coil 170b is connected to pole 180b.

One end of each of the relay coils is connected to one terminal of a battery or power supply 182. The other terminal of power supply 182 is connected to one terminal of each photoelectric cell. The other terminal of photoelectric cell 72a is connected to pole 184 of double-pole, double throw reversing switch 39. Switch contacts 186 and 187 are connected to the other end of relay coil 181b.

The photoelectric cells 72a, 72b are so disposed above and below slit enlargement 70 so that each cell will be illuminated with somewhat attenuated intensity when the scanning line SL1 is centered at the slot 68 as indicated in FIG. 8. The substantially equal illumination of reduced intensity of both cells is indicated by dotted lines L2' and L2'' in FIG. 9 while the concentrated line of light between the cells is indicated schematically by line SL1. If during operation of the apparatus shutter 60 should be driven upwardly slower than the upward movement of scanning line SL1, then line SL1 will shift to upper line SL2' shown in FIG. 8 to illuminate upper cell 72b to a greater extent while lower cell 72a will be illuminated to a lesser extent. During downward movement of the shutter slot the cover shifts of line SL1 occur as slot 68 lead or lags line SL1. The changes in relative illumination of the cells are taken advantage of in operating the braking means of the circuit 150, as will be described in connection with the description of operation of the camera C1.

In operation of the camera C1, film 36 will be threaded through the camera as shown in the drawing. Slot 68 will be located at upper or lower ends of film section 36'. A copy sheet S will be placed on plate 30. Switches 42 and 43 will be closed to light lamp 112 and to close the brake circuit. The carriage will be located near one end of travel at limit switch 136 or 138. Switches 38 and 39 will be reversed in position. Then the START switch 40 will be closed momentarily. Motors 92 and 125 will start. The switch 40 is released after the motors start, the carriage moves away from switch 136 or 138 so that this limit switch closes to keep the motor circuit closed. Operation then proceeds automatically. Photoelectric cells 72a and 72b pick up light of reduced intensity reflected from sheet S and they in turn activate relays 175a, 175b so that the poles 180a and 180b move to the center contacts C2, C2'. As a result a limited braking force is applied by both braking magnets cooperatively to the rotating disk 168 and shaft 90.

Suppose the shutter 60 is moving upwardly and slot 68 rises in coordination with upward movement of scanning line SL1. It will be understood that the motors operate independently of each other even though they are connected in parallel. The setting of control 44 determines the relative speed of travel of the shutter with respect to travel of the carriage 115 carrying the lamp fixture depending on the magnification desired of the copy of sheet S.

If for any one of a number of reasons the relative speeds of the two motors should vary so that the slot 68 moves upwardly faster than the scanning line SL1 then as previously mentioned cell 72b will be illuminated with less intensity and cell 72a will be illuminated with more intensity. As a resut, less current will flow to relay coil 175a and pole 180a will move to contact C1 to apply more current to brake coil 170a. This will magnetize core 169a more to apply greater braking force to disk 168 to slow down the rotation of shaft 90. At the same time more current flows to relay coil 175b and pole 180b moves to contact C1' to pass more current to coil 170b and magnetize core 169b more so that cooperatively with core 169a more braking force is applied to disk 168.

It will be found in practice that one braking core will in general respond before the other so that operating speed of motor 92 is corrected even before the other braking core can respond. However, for a larger speed correction both braking cores working together will effect the required correction to center slot 68 at line SL1.

Suppose slot 68 moves upwardly slower than line SL1. This lag in shutter speed results in greater illumination of cell 72b and less illumination of cell 72a. As a result the braking force on the disk 168 is reduced as pole 180a moves to open contact C3 and pole 180b moves to open contact C2'.

When the carriage 115 reaches limit switch 138, it opens this switch and the motors stop. Exposed film section 36' is withdrawn from the camera for development. The exposed film section will be protected from ambient light in any suitable manner if it is sensitive to ambient light.

For the next cycle of operation, the slot 68 will move downwardly. The cells 72a and 72b must be mutually reversed in connection in the circuit by reversing switch 39. Then as the slot 68 moves down, if the shutter moves too fast downwardly upper cell 72b will be illuminated with reduced intensity and lower cell 72a will be illuminated with more intensity. The operation of the braking circuit will be as above described and the rotation of motor shaft 90 will be slowed. If slot 68 moves down too slowly with respect to scanning line SL1, then lower cell 72a will be illuminated with more intensity and upper cell 72b will be illuminated with less intensity. Cooperative release of braking pressure will occur at the braking electromagnets. It will be noted that these cooperative increased braking and decreased braking effects occur because the relays 175a and 175b have reversely arranged sets of three contacts, each with one contact C3 open when the relay 175a is fully energized and with one contact C3' open when relay 175b is substantially deenergized.

If desired the cells 72a and 72b may be illuminated by a small projection lamp mounted on carriage 115. The copy sheet S will then be illuminated by its own separate long lamp. In circuit 150 the lamp 112 whose light illuminates the cells may be such a projection lamp while the lamp 112a which illuminates the copy sheet is shown ocnnected in parallel with lamp 112.

In FIGS. 10–13 is shown a large copying camera C2 which embodies most of the basic control and operating principles described in connection with camera C1. In camera C2 parts corresponding to those of camera C1 and having the same functions are indicated by identical primed numbers. Camera C2 has a vertical subject copy board 200 on which a copy sheet to be photographed is mounted. This board is supported on a frame 202 adjustably movable on horizontal rails 204. This frame carries electrical controls of the camera including the motor reversing switch 38', photoelectric cell reversing switch 39', START switch 40', and ON–OFF switches 42' and 43'. The copy board supports a framework 203 on which is mounted horizontal rack gear or track 206. Lamp drive motor 125' of carriage 205 has a spur gear 208 on its shaft 210 engaged with the rack gear. Attached to opposite ends of the shaft are rollers 212 and 214 which roll along horizontal rails 216, 218.

Motor 125' carries a vertical bar 220 from which is suspended the vertical lamp fixture 222. Lamp 112a' is vertically disposed and faces the copy board to illuminate a narrow vertical area of a copy sheet placed thereon. Limit switches 136' and 138' are mounted on opposite end rails 225, 226. These switches are contacted by the motor housing at opposite ends of its assigned path of travel on the framework.

Prism 100' bends the light path P from the subject copy board to lens 102'. The prism and lens are supported on a frame 227 at the front of bellows 229. The bellows is shown partially broken away. The bellows terminates close to movable vertical shutter 60.' The frame 227 is supported adjustably on rails 232 extending at right angles to rails 204. The shutter has a vertical slot 68' through which light passes from lens 102' to image copy board 235 upon which a light sensitive sheet may be supported for photographically copying the subject matter on the subject copy board. If desired the board 235 may be a vacuum type of board for holding a sheet of film by suction in position for photographing the subject copy. The image copy board is shown partially broken away to expose the slot 68' of the shutter 230.

Near the upper end of the slot at enlargement 70' is a housing 74 for horizontally spaced photoelectric cells 72a' and 72b' exposed to light of a projection lamp 112' mounted on the back of the lamp fixture 222. The cells 72a' and 72b' can be located outside the field encompassed by the bellows.

The shutter 60' including the photoelectric housing 74' is supported by a bar 250 extending down from shutter drive motor 92', of carriage 275. The motor is arranged like motor 125'. It has a shaft 90' with rollers 254 at opposite ends riding on rails 256 of framework 260. Braking device 91' is joined to the motor housing. The framework 260 carries a horizontal rack gear or track 262. Spur gear 264 on shaft 252 engages the rack gear 262 so that the carriage 275 rides along the rails to move the shutter in a path parallel to the image copy board 235. The image copy board 235 is supported on a frame 276 movably mounted on horizontal rails 232. The magnification-reduction control 44' is mounted on the end of frame 276.

The several electrical components of the camera C2 are connected in a circuit identical to circuit 150 and the detailed explanation of circuits 150 above will in general suffice for camera C2.

Lamp 112a' is connected in parallel with lamp 112' like lamps 112a and 112 respectively in circuit 150. The lamp 112' is disposed to illuminate both cells 72a' and 72b' with equal but reduced intensity when the light of lamp 112' is centered between the two cells in alignment with the center of slot 68'. If the shutter 60' moves too fast to the left as viewed in FIG. 10 then cell 72a' will be illuminated to a greater extent and cell 72b' will be illuminated to lesser extent. This is similar to what occurs at cells 72a and 72b as explained in connection with excessively fast upward movement of shutter 60. Braking device 91' is then operative to reduce the speed of rotation of shaft 90'. If the shutter 60' moves too slowly to the left as viewed in FIG. 10, then cell 72b' will be illuminated to a greater extent and cell 72a' will be illuminated to a lesser extent and the braking device 91' will operate to release braking force on shaft 90' which will speed up. Converse illumination and braking effects take place during excessively fast and slow shutter movements to the right, provided that switch 39' has been reversed as required for proper operation of the camera.

Control 44' is set to determine the relative speed of motor 92' with respect to the lamp drive motor 125'. The limit switches 136' and 138' in circuit with the motor 125' open this circuit when the carriage 205 reaches either limit switch. The lamps 112' and 112a' are turned on and off when the switch 42' is closed and opened respectively. The reversing switch 38' serves to reverse direction of drive of the motors 92' and 125'.

The camera C2 operates automatically like camera C1, once it is started upon momentary closing of START switch 40'.

In both cameras C1 and C2 the correction of drive speed of the shutter is dependent on the drive of the lamp 112 or 112'. The use of slotted shutters make it possible to use smaller copy scanning lamps to obtain the same photographic results than can be obtained with larger lamps in cameras lacking slotted shutters. Also better contrast is obtained. Less sensitive film may be used. The subject copy is less subject to damage by intense heat and light since only a small part of the subject at a time is exposed to the scanning light.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A scanning system for a camera or the like, comprising a support for a subject to be scanned, an elongated scanning lamp fixture, means supporting said lamp fixture to illuminate a long narrow area extending across said subject, first motor means operatively connected to said lamp fixture for moving said fixture in a straight first path perpendicular to the illuminated area of the subject, a film holder for supporting photographic film in a vertical plane, an opaque shutter supported adjacent to said film holder in an optical path between said film and subject, said shutter being disposed in another vertical plane parallel to a section of said film and having a straight slot extending across said shutter to expose a narrow area of said film to an image of the long narrow illuminated area of said subject, a lens disposed in said optical path for focusing said image on said film section, a pair of spaced photoelectric cells carried by said shutter, said cells being disposed laterally of opposite edges of said slot to receive light from said light fixture, second motor means operatively connected to said shutter to drive the same so that the slot moves perpendicular to said narrow area of the film, said first and second motor means being operative independently of each other, braking means connected to said second motor means, and circuit means interconnecting said photoelectric cells and braking means to coordinate speed of drive of said shutter with speed of movement of said image on said film.

2. A scanning system for a camera or the like, comprising a support for a subject to be scanned, an elongated scanning lamp fixture, means supporting said lamp fixture to illuminate a long narrow area extending across said subject, first motor means operatively connected to said lamp fixture for moving said fixture in a straight first path perpendicular to the illuminated area of the subject, a film holder for supporting photographic film in a vertical plane, an opaque shutter supported adjacent to said film holder in an optical path between said film and subject, said shutter being disposed in another vertical plane parallel to a section of said film and having a straight slot extending across said shutter to expose a narrow area of said film to an image of the long narrow illuminated area of said subject, a lens disposed in said optical path for focusing said image on said film section, a pair of spaced photoelectric cells carried by said shutter, said cells being disposed laterally of opposite edges of said slot to receive light from said light fixture, second motor means operatively connected to said shutter to drive the same in a second path so that the slot moves perpendicular to said narrow area of the film, said first and second motor means being operative independently of each other, braking means connected to said second motor means, first circuit means interconnecting said cells and braking means to coordinate speed of drive of said shutter with speed of movement of said image on said film, and second circuit means including a pair of limit switches in circuit with said first and second motor means to stop travel of said lamp fixture at each end of said first straight path and to stop movement of said shutter when the lamp fixture stops.

3. A scanning system of a camera or the like, comprising a support for a subject to be scanned, on elongated scanning lamp fixture, means supporting said lamp fixture to illuminate a long narrow area extending across said subject, first motor means operatively connected to said lamp fixture for moving said fixture in a straight first path perpendicular to the illuminated area of the subject, a film holder for supporting photographic film in a vertical plane, an opaque shutter supported adjacent to said film holder in an optical path between said film and subject, said shutter being disposed in another vertical plane parallel to a section of said film and having a straight slot extending across said shutter to expose a narrow area of said film to an image of the long narrow illuminated area of said subject, a lens disposed in said optical path for focusing said image on said film section, a pair of spaced photoelectric cells carried by said shutter, said cells being disposed laterally of opposite edges of said slot to receive light from said light fixture, second motor means operatively connected to said shutter to drive the same in a second path so that the slot moves perpendicular to said narrow area of the film, said first and second motor means being operative independently of each other, braking means connected to said second motor means, first circuit means interconnecting said cells and braking means to coordinate speed of drive of said shutter with speed of movement of said image of said film, and second circuit means including a pair of limit switches in circuit with said first and second motor means to stop travel of said lamp fixture at each end of said first straight path and to stop movement of said shutter when the lamp fixture stops, said shutter and said subject being disposed in vertical planes disposed perpendicular to each other, and a prism disposed in said optical path for bending end portions of said optical path 90° to each other.

4. A scanning system for a camera or the like, comprising a support for a subject to be scanned, an elongated scanning lamp fixture, means supporting said lamp fixture to illuminate a long narrow area extending across said subject, first motor means operatively connected to said lamp fixture for moving said fixture in a straight first path perpendicular to the illuminated area of the subject, a film holder for supporting photographic film in a vertical plane, an opaque shutter supported adjacent to said film holder in an optical path between said film and subject, said shutter being disposed in another vertical plane parallel to a section of said film and having a straight slot extending across said shutter to expose a narrow area of said film to an image of the long narrow illuminated area of said subject, a lens disposed in said optical path for focusing said image on said film section, a pair of spaced photoelectric cells carried by said shutter, said cells being disposed laterally of opposite edges of said slot to receive light from said light fixture, second motor means operatively connected to said shutter to drive the same in a second so that the slot moves perpendicular to said narrow area of the film, said first and second motor means being operative independently of each other, braking means connected to said motor means, first circuit means interconnecting said cells and braking means to coordinate speed of drive of said shutter with speed of movement of said image on said film, and second circuit means including a pair of limit switches in circuit with said first and second motor means to stop travel of said lamp fixture at each end of said first straight path and to stop movement of said shutter when the lamp fixture stops, said subject being disposed in a horizontal plane, and a prism disposed in said optical path for bending end portions of said optical path 90° to each other.

5. A scanning system for a camera or the like, comprising a support for a subject to be scanned, an elongated scanning lamp fixture, means supporting said lamp fixture to illuminate a long narrow area extending across said subject, first motor means operatively connected to said lamp fixture for moving said fixture in straight first path perpendicular to the illuminated area of the subject, a film holder for supporting photographic film in a vertical plane, an opaque shutter supported adjacent to said film holder in an optical path between said film subject, said shutter being disposed in another vertical plane parallel to a section of said film and having a straight slot extending across said shutter to expose a narrow area of said film to an image of the long narrow illuminated area of said subject, a lens disposed in said optical path for focusing said image on said film section, a projection lamp carried by said fixture, a pair of spaced photoelectric cells carried by said shutter, said cells being disposed to receive light from said projection lamp, second motor means operatively connected to said shutter to drive the same so that the slot moves perpendicular to said narrow area of the film, said first and second motor means being operative independently of each other, electromagnetic braking means connected to said second motor means and circuit means interconnecting said photoelectric cells and braking means to coordinate speed of drive of said shutter with speed of movement of said image on said film.

6. A scanning system for a camera or the like, comprising a horizontal transparent plate for supporting a subject to be scanned, an elongated scanning lamp fixture, carriage means supporting said lamp fixture to illuminate a long narrow area extending across said plate, first motor means operatively connected to said lamp fixture for moving said carriage means in a first straight horizontal path perpendicular to the illuminated area of said plate, a film holder for supporting a section of photographic film in a vertical plane, a flexible opaque shutter supported on rollers adjacent to said film holder and disposed in an optical path between said film and said plate, said shutter having a section disposed in a vertical plane parallel to said section of the film and having a straight horizontal slot to expose a narrow horizontal area of the film to an image of the illuminated area of the plate, a lens disposed in said optical path for focusing said image onto said film section, a photocell housing secured to said shutter, a pair of vertically spaced photoelectric cells carried by said housing at said slot to receive light from said illuminated area of the plate, second motor means operatively connected to said shutter to drive the same so that the slot moves vertically perpendicular to the exposed narrow area of the film, said first and second motor means being operative independently of each other, electromagnetic braking means connected to said second motor means, and circuit means interconnecting said photoelectric cells and braking means to coordinate speed of drive of said shutter with speed of movement of said image on said film.

7. A scanning system for a camera or the like, comprising a horizontal transparent plate for supporting a subject to be scanned, an elongated scanning lamp fixture, carriage means supporting said lamp fixture to illuminate a long narrow area extending across said plate, first motor means operatively connected to said lamp fixture for moving said carriage means in a first straight horizontal path perpendicular to the illuminated area of said plate, a film holder for supporting a section of photographic film in a vertical plane, a flexible opaque shutter supported on rollers adjacent to said film holder and disposed in an optical path between said film and said plate, said shutter having a section disposed in a vertical plane parallel to said section of the film and having a straight horizontal slot to expose a narrow horizontal area of the film an image of the illuminated area of the plate, a lens disposed in said optical path for focusing said image onto said film section, a photocell housing secured to said shutter, a pair of vertically spaced photoelectric cells carried by said housing at said slot to receive light from said illuminated area of the plate, second motor means operatively connected to said shutter to drive the same so that the slot moves vertically perpendicular to the exposed narrow area of the film, said first and second motor means being operative independently of each other, electromagnetic braking means connected to said second motor means, and circuit means interconnecting said photoelectric cells and braking means to coordinate speed of drive of said shutter with speed of movement of said image on said film, and a prism disposed in said optical path for bending end portions of said optical path 90° to each other.

8. A scanning system for a camera or the like, comprising a horizontal transparent plate for supporting a subject to be scanned, an elongated scanning lamp fixture, carriage means supporting said lamp fixture to illuminate a long narrow area extending across said plate, first motor means operatively connected to said lamp fixture for moving said carriage means in a first straight horizontal path perpendicular to the illuminated area of said plate, a film holder for supporting a section of photographic film in a vertical plane, a flexible opaque shutter supported on rollers adjacent to said film holder and disposed in an optical path between said film and said plate, said shutter having a section disposed in a vertical plane parallel to said section of the film and having a straight horizontal slot to expose a narrow horizontal area of the film to an image of the illuminated area of the plate, a lens disposed in said optical path for focusing said image onto said film section, a photocell housing secured to said shutter, a pair of vertically spaced photoelectric cells carried by said housing at said slot to receive light from said illuminated area of the plate, second motor means, a mechanical gear and threaded shaft assembly operatively interconnected said second motor means and said shutter to drive the same so that the slot moves vertically perpendicular to the exposed narrow area of the film, said first and second motor means being operative independently of each other, electromagnetic braking means connected to said second motor means, said braking means including two cooperative braking electromagnets, relays connected to the electromagnets for energizing the same, and circuit means interconnecting the photoelectric cells and relays so that both braking electromagnets cooperatively increase braking force on the second motor means when speed of drive of said shutter exceeds speed of movement of said image on said film, and cooperatively reduce braking force on the second motor means when speed of drive of said shutter lags speed of movement of said image on said film.

9. A scanning system for a camera or the like, comprising a horizontal transparent plate for supporting a subject to be scanned, an elongated scanning lamp fixture, carriage means supporting said lamp fixture to illuminate a long narrow area extending across said plate, first motor means operatively connected to said lamp fixture for moving said carriage means in a first straight horizontal path perpendicular to the illuminated area of said plate, a film holder for supporting a section of photographic film in a vertical plane, a flexible opaque shutter supported on rollers adjacent to said film holder and disposed in an optical path between said film and said plate, said shutter having a section disposed in a vertical plane parallel to said section of the film and having a straight horizontal slot to expose a narrow horizontal area of the film to an image of the illuminated area of the plate, a lens disposed in said optical path for focusing said image onto said film section, a photocell housing secured to said shutter, a pair of vertically spaced photoelectric cells carried by said housing at said slot to receive light from said illuminated area of the plate, second motor means, a mechanical gear and threaded shaft assembly operatively interconnecting said second motor means and said shutter to drive the same so that the slot moves verticaly perpendicular to the exposed narrow area of the film, said first and second motor means being operative independently of each other, electromagnetic braking means connected to said second motor means, said braking means including two cooperative braking electromagnets, relays connected to the electromagnets for energizing the same, and circuit means interconnecting the photoelectric cells and relays so that both braking electromagnets cooperatively increase braking force on the second motor means when speed of drive of said shutter exceeds speed of movement of said image on said film, and cooperatively reduce braking force on the second motor means when speed of drive of said shutter lags speed of movement of said image on said film, and other circuit means including a pair of limit switches respectively disposed at opposite ends of the first horizontal path of travel of said carriage means, said limit switches being connected in circuit with said first and second motor means to stop travel of said carriage and scanning lamp fixture at each end of said first path and to stop movement of said shutter when said carriage and lamp fixture stop.

10. A scanning system for a camera or the like, comprising a support for a subject to be scanned, an elongated scanning lamp fixture, means supporting said lamp fixture to illuminate a long narrow area extending across said subject, first motor means operatively connected to said lamp fixture for moving said fixture in a straight first path perpendicular to the illuminated area of the subject, a film holder for supporting photographic film in a vertical plane, an opaque shutter supported adjacent to said film holder in an optical path between said film and subject, said shutter being disposed in another vertical plane parallel to a section of said film and having a straight slot extending across said shutter to expose a narrow area of said film to an image of the long narrow illuminated area of said subject, a lens disposed in said optical path for focusing said image on said film section, a pair of spaced photoelectric cells carried by said shutter, said cells being disposed laterally of opposite edges of said slot to receive light from said light fixture, second motor means operatively connected to said shutter to drive the same in a second path so that the slot moves perpendicular to said narrow area of the film, said first and second motor means being operative independently of each other, braking means connected to said second motor means, first circuit means interconnecting said cells and braking means to coordinate speed of drive of said shutter with speed of movement of said image on said film, and second circuit means including a pair of limit switches in circuit with said first and second motor means to stop travel of said lamp fixture at each end of said first straight path and to stop movement of said shutter when the lamp fixture stops, said shutter being a rigid plate and said film holder being a rigid board, a bellows disposed between said shutter and said lens, and a frame supporting said shutter.

11. A scanning system for a camera or the like, comprising a support for a subject to be scanned, an elongated scanning lamp fixture, means supporting said lamp fixture to illuminate a long narrow area extending across said subject, first motor means operatively connected to said lamp fixture for moving said fixture in a straight first path perpendicular to the illuminated area of the subject, a film holder for supporting photographic film in a vertical plane, an opaque shutter supported adjacent to said film holder in an optical path between said film and subject, said shutter being disposed in another vertical plane parallel to a section of said film and having a straight slot extending across said shutter to expose a narrow area of said film to an image of the long narrow illuminated area of said subject, a lens disposed in said optical path for focusing said image on said film section, a pair of spaced photoelectric cells carried by said shutter, said cells being disposed laterally of opposite edges of said slot to receive light from said light fixture, second motor means operatively connected to said shutter to drive the same so that the slot moves perpendicular to said narrow area of the film, said first and second motor means being operative independently of each other, braking means connected to said second motor means, and circuit means interconnecting said photoelectric cells and braking means to coordinate speed of drive of said shutter with speed of movement of said image on said film, said shutter and said subject being disposed in vertical planes disposed perpendicular to each other, and a prism disposed in said optical path for bending end portions of said optical path 90° to each other, said shutter being a rigid plate and said film holder being a rigid board, a bellows disposed between said shutter and said lens, and a frame supporting said shutter and film holder for adjustable positioning of the shutter and board while said bellows spans the space between said lens and said shutter, said support being another rigid vertical board movably mounted on said frame, frameworks carried by the boards respectively, said first and second motor drive means being carried by said frameworks respectively, said scanning lamp fixture being carried by said first motor means, and said shutter being carried by said second motor means.

12. A scanning system for a camera or the like, comprising a support for a subject to be scanned, an elongated scanning lamp fixture, means supporting said lamp fixture to illuminate a long narrow area extending across said subject, first motor means operatively connected to said lamp fixture for moving said fixture in a straight first path perpendicular to the illuminated area of the subject, a film holder for supporting photographic film in a vertical plane, an opaque shutter supported adjacent to said film holder in an optical path between said film and subject, said shutter being disposed in another vertical plane parallel to a section of said film and having a straight slot extending across said shutter to expose a narrow area of said film to an image of the long narrow illuminated area of said subject, a lens disposed in said optical path for focusing said image on said film section, a pair of spaced photoelectric cells carried by said shutter, said cells being disposed laterally of opposite edges of said slot to receive light from said light fixture, second motor means operatively connected to said shutter to drive the same so that the slot moves perpendicular to said narrow area of the film, said first and second motor means being operative independently of each other, braking means connected to said second motor means, and circuit means interconnecting said photoelectric cells and braking means to coordinate speed of drive of said shutter with speed of movement of said image on said film, said braking means including two cooperative braking electromagnets, relays respectively connected to the electromagnets for energizing the same, means interconnecting the photoelectric cells and relays so that both braking electromagnets cooperatively increase braking force on the second motor means when speed of drive of said shutter exceeds speed of movement of said image on said film, and cooperatively reduce braking force on the second motor means when speed of drive of said shutter lags speed of movement of said image on said film.

13. A scanning system for a camera or the like, comprising a support for a subject to be scanned, an elongated scanning lamp fixture, means supporting said lamp fixture to illuminate a long narrow area extending across said subject, first motor means operatively connected to said lamp fixture for moving said fixture in a straight first path perpendicular to the illuminated area of the subject, a film holder for supporting photographic film in a vertical plane, an opaque shutter supported adjacent to said film holder in an optical path between said film and subject, said shutter being disposed in another vertical plane parallel to a section of said film and having a straight slot extending across said shutter to expose a narrow area of said film to an image of the long narrow illuminated area of said subject, a lens disposed in said optical path for focusing said image on said film section, a pair of spaced photoelectric cells carried by said shutter, said cells being disposed laterally of opposite edges of said slot to receive light from said light fixture, second motor means operatively connected to said shutter to drive the same so that the slot moves perpendicular to said narrow area of the film, said first and second motor means being operative independently of each other, braking means connected to said second motor means, and circuit means interconnecting said photoelectric cells and braking means to coordinate speed of drive of said shutter with speed of movement of said image on said film, said braking means including two cooperative braking electromagnets, relays respectively connected to the electromagnets for energizing the same, means interconnecting the photoelectric cells and relays so that both braking electromagnets cooperatively increase braking force on the second motor means when speed of drive of said shutter exceeds speed of movement of said image on said film, and cooperatively reduce braking force on the second motor means when speed of drive of said shutter lags speed of movement of said image on said film, means for reversing drive of said first and second motor means, a pair of limit switches in circuit with said first and second motor means to stop travel of said lamp fixture at each end of said first straight path and to stop movement of said shutter when the lamp fixture stops.

14. A scanning system for a camera or the like, comprising a support for a subject to be scanned, an elongated scanning lamp fixture, means supporting said lamp fixture to illuminate a long narrow area extending across said subject, first motor means operatively connected to said lamp fixture for moving said fixture in a straight first path perpendicular to the illuminated area of the subject, a film holder for supporting photographic film in a vertical plane, an opaque shutter supported adjacent to said film holder in an optical path between said film and subject, said shutter being disposed in another vertical plane parallel to a section of said film and having a straight slot extending across said shutter to expose an arrow area of said film to an image of the long narrow illuminated area of said subject, a lens disposed in said optical path for focusing said image on said film section, a pair of spaced photoelectric cells carried by said shutter, said cells being disposed laterally of opposite edges of said slot to receive light from said light fixture, second motor means operatively connected to said shutter to drive the same so that the slot moves perpendicular to said narrow area of the film, said first and second motor means being operative independently of each other, braking means connected to said second motor means, and circuit means interconnecting said photoelectric cells and braking means to coordinate speed of drive of said shutter with speed of movement of said image on said film, said braking means including two cooperative braking electromagnets, relays respectively connected to the electromagnets for energizing the same, means interconnecting the photoelectric cells and relays so that both braking electromagnets cooperatively increase braking force on the second motor means when speed of drive of said shutter exceeds speed of movement of said image on said film, and cooperatively reduce braking force on the second motor means when speed of drive of said shutter lags speed of movement of said image on said film, means for reversing drive of said first and second motor means, a pair of limit switches in circuit with said first and second motor means to stop travel of said lamp fixture at each end of said first straight path and to stop movement of said shutter when the lamp fixture stops, and a reversing switch in circuit with said photoelectric cells to reverse connections of the photoelectric cells to the respective relays so that the braking electromagnets cooperatively permit increase and decrease speed of said second motor means in both directions of travel of the shutter.

References Cited

UNITED STATES PATENTS

| | | | |
|---|---|---|---|
| 2,153,186 | 4/1939 | Henderson | 88—24 |
| 2,313,119 | 3/1943 | Brand | 95—4.5 |
| 2,778,873 | 1/1957 | Nyman | 88—24 |
| 2,919,635 | 1/1960 | Levine et al. | 88—24 |

NORTON ANSHER, *Primary Examiner.*

W. A. SIVERTSON, *Assistant Examiner.*